(12) United States Patent
Hu et al.

(10) Patent No.: US 11,228,742 B2
(45) Date of Patent: Jan. 18, 2022

(54) PROJECTION SYSTEM AND PROJECTION METHOD

(71) Applicant: APPOTRONICS CORPORATION LIMITED, Shenzhen (CN)

(72) Inventors: Fei Hu, Guangdong (CN); Zuqiang Guo, Guangdong (CN); Peng Du, Guangdong (CN); Yi Li, Guangdong (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 52 days.

(21) Appl. No.: 16/605,366

(22) PCT Filed: Jul. 28, 2017

(86) PCT No.: PCT/CN2017/094794
§ 371 (c)(1),
(2) Date: Oct. 15, 2019

(87) PCT Pub. No.: WO2018/192130
PCT Pub. Date: Oct. 25, 2018

(65) Prior Publication Data
US 2021/0127098 A1 Apr. 29, 2021

(30) Foreign Application Priority Data
Apr. 17, 2017 (CN) .......................... 201710249602.4

(51) Int. Cl.
*H04N 9/31* (2006.01)
*G03B 21/00* (2006.01)
*G03B 21/20* (2006.01)

(52) U.S. Cl.
CPC ......... *H04N 9/3179* (2013.01); *G03B 21/008* (2013.01); *G03B 21/208* (2013.01); *H04N 9/3152* (2013.01); *H04N 9/3155* (2013.01)

(58) Field of Classification Search
CPC .. H04N 9/3179; H04N 9/3152; H04N 9/3155; G03B 21/208; G03B 21/008
(Continued)

(56) References Cited

U.S. PATENT DOCUMENTS

| 2002/0021292 A1 | 2/2002 | Sakashita |
| 2004/0001184 A1* | 1/2004 | Gibbons .............. H04N 9/3105 353/31 |

(Continued)

FOREIGN PATENT DOCUMENTS

| CN | 1538200 A | 10/2004 |
| CN | 101454716 A | 6/2009 |

(Continued)

OTHER PUBLICATIONS

International Search Report and Written Opinion for International Application No. PCT/CN2017/094794, dated Sep. 26, 2017.
(Continued)

*Primary Examiner* — Michael Lee
(74) *Attorney, Agent, or Firm* — Marshall, Gerstein & Borun LLP

(57) ABSTRACT

A projection system includes a signal processor, a light source, an optical relay system, an adjusting member, and a DMD. The signal processor receives image data. The signal processor increases grayscale values of pixels of the image data. The optical relay system provides illumination light to the DMD for modulating to obtain projection light required for a projection image. The adjusting member reduces the luminous flux of the illumination light provided to the DMD when the grayscale values of the pixels of the image data are increased. A reduction ratio of the luminous flux of the illumination light matches an increase ratio of the grayscale values of the image data. The DMD modulates the adjusted illumination light according to the image data with increased
(Continued)

grayscale values to generate the projection light required for the projection image.

12 Claims, 6 Drawing Sheets

(58) Field of Classification Search
USPC .......................................................... 348/759
See application file for complete search history.

(56) References Cited

U.S. PATENT DOCUMENTS

| | | | |
|---|---|---|---|
| 2004/0257318 A1 | 12/2004 | Itoh | |
| 2005/0017990 A1 | 1/2005 | Yoshida | |
| 2005/0128441 A1* | 6/2005 | Morgan | G03B 21/2033 353/102 |
| 2005/0146541 A1* | 7/2005 | Pettitt | G09G 3/34 345/698 |
| 2005/0237628 A1* | 10/2005 | Shimizu | G02B 27/0988 359/738 |
| 2006/0132471 A1* | 6/2006 | Winer | H04N 9/3114 345/204 |
| 2006/0132510 A1* | 6/2006 | Bell | G09G 3/002 345/691 |
| 2006/0152687 A1* | 7/2006 | Robinson | H04N 5/74 353/97 |
| 2006/0221020 A1* | 10/2006 | Winer | G09G 3/3406 345/84 |
| 2007/0013871 A1* | 1/2007 | Marshall | H04N 9/3155 353/20 |
| 2007/0064007 A1* | 3/2007 | Childers | G09G 3/346 345/589 |
| 2008/0158263 A1* | 7/2008 | Hui | G09G 3/3406 345/690 |
| 2011/0310131 A1 | 12/2011 | Fergason et al. | |
| 2012/0147279 A1* | 6/2012 | Koyanagi | G03B 21/2033 349/5 |
| 2014/0327885 A1* | 11/2014 | Mansur | H04N 9/3126 353/31 |
| 2015/0015786 A1 | 1/2015 | Watanabe | |

FOREIGN PATENT DOCUMENTS

| | | |
|---|---|---|
| CN | 101600120 A | 12/2009 |
| CN | 102483904 A | 5/2012 |
| CN | 102621698 A | 8/2012 |
| CN | 105632386 A | 6/2016 |
| JP | H05066501 A | 3/1993 |
| JP | 2002031846 A | 1/2002 |
| JP | 2006165828 A | 6/2006 |
| JP | 2008145508 A | 6/2008 |
| JP | 2009157163 A | 7/2009 |
| JP | 2015018071 A | 1/2015 |
| JP | 2016178487 A | 10/2016 |

OTHER PUBLICATIONS

First Office Action for application No. CN201710249602.4, dated Aug. 21, 2020.
First Search Report for CN2017102496024, dated May 18, 2021.
Second Office Action issued to application No. CN201710249602. 4, dated Mar. 31, 2021.
Supplementary Search Report for CN2017102496024.
Extended European Search Report issued for application No. 17905978. 7, dated Apr. 3, 2020.
Notice of Reasons for Refusal issued to application No. JP2019-556586, dated Jan. 14, 2021.
Notice of Reasons for Refusal issued to Japanese patent application No. 2019-556586, dated Jun. 10, 2021.

* cited by examiner

PROJECTION SYSTEM AND PROJECTION METHOD

CROSS-REFERENCE TO RELATED APPLICATION

This is the United States national phase of International Patent Application No. PCT/CN2017/094794 filed Jul. 28, 2017, which claims priority to CN 201710249602.4 filed on Apr. 17, 2017, the entire contents of each of which are hereby incorporated by reference.

TECHNICAL FIELD

The present disclosure relates to a projection system and a projection method.

BACKGROUND

An existing projection system generally includes a light source device, a spatial light modulator (such as a LCOS spatial light modulator or a DMD spatial light modulator), and a projection lens. The light source device emits, for example, light of three colors of red, green and blue. The spatial light modulator image-modulates the light emitted by the light source device based on image data, and the projection lens projects image light output by the spatial light modulator to display a projection image. However, the existing projection system may have low contrast, which needs to be improved.

SUMMARY

In order to solve the problem of relatively low contrast of the projection system in the related art, the present disclosure provides a projection system and a projection method having relatively high contrast.

A projection system includes:

a signal processor configured to receive image data including a plurality of grayscale values, each of which corresponds to one pixel, wherein the signal processor is further configured to increase grayscale values of a plurality of pixels of the image data;

a light source configured to emit illumination light, an optical relay system configured to provide the illumination light to a DMD for modulating to obtain projection light required for a projection image;

an adjusting member configured to reduce luminous flux of the illumination light provided to the DMD when the grayscale values of the plurality of pixels of the image data are increased so that a reduction ratio of the luminous flux of the illumination light matches an increase ratio of the plurality of grayscale values of the image data; and the DMD configured to modulate the adjusted illumination light according to the image data with the increased grayscale values, to generate the projection light required for the projection image, brightness of the projection light matches the image data prior to increasing the grayscale values.

In an embodiment, the signal processor receives the image data, the image data includes subframe image data, the signal processor determines whether a highest grayscale value of respective pixels in the subframe image data is smaller than a preset value, when the highest grayscale value of the respective pixels in the subframe image data is smaller than the preset value, the signal processor controls to increase the grayscale values of the respective pixels of the subframe image data, wherein a light emitting device adjusts the luminous flux of the illumination light to be smaller than standard luminous flux $L_O$ when the highest grayscale value of the respective pixels in the subframe image data is smaller than the preset value; and when the highest grayscale value of the respective pixels in the subframe image data is larger than or equal to the preset value, the signal processor keeps the grayscale values of the respective pixels of the subframe image data unchanged and provides the subframe image data to the DMD; the light emitting device emits illumination light of the standard luminous flux $L_O$, and the DMD modulates the illumination light of the standard luminous flux $L_O$ based on the subframe image data with the unchanged grayscale values, to generate the projection light required for the projection image.

In an embodiment, a grayscale maximum value that the projection system can reach is set to be $G_{Max}$, the preset value is set to be $G_R$, and the preset value $G_R$ is smaller than or equal to the grayscale maximum value $G_{Max}$.

In an embodiment, the preset value is set to be 90% of the grayscale maximum value $G_{Max}$.

In an embodiment, the signal processor further calculates an adjustment coefficient k when the highest grayscale value of the respective pixels in the subframe image data is smaller than the preset value, the adjustment coefficient k is equal to $G_{Max}/G_L$, $G_L$ represents the highest grayscale value of the respective pixels in the subframe image data, the signal processor adjusts a grayscale value of each of the plurality of pixels of the image data to be k times the grayscale value of each of the pixels of the image data based on the adjustment coefficient k, and the luminous flux of the illumination light emitted by the light emitting device is adjusted to be 1/k of the standard luminous flux $L_O$.

In an embodiment, the adjusting member is configured to adjust the luminous flux of the illumination light emitted by the light source.

In an embodiment, the adjusting member is configured to reduce a divergence angle of the illumination light provided by the optical relay system, increase an F number of the illumination light provided by the optical relay system, and reduce the luminous flux of the illumination light provided by the optical relay system.

In an embodiment, the adjusting member includes an adjustable aperture, the adjustable aperture is disposed at an aperture stop of the optical relay system; the adjustable aperture is configured to block a peripheral portion of a light beam of the illumination light incident to the adjustable aperture, such that the illumination light exiting from the adjustable aperture has a smaller divergence angle, an increased F number, and a reduced luminous flux with respect to the illumination light incident to the adjustable aperture.

In an embodiment, the optical relay system includes a light homogenizing member configured to homogenize the illumination light; the adjusting member includes a liquid crystal lens located on an optical path prior to the light homogenizing member, wherein light exiting from the liquid crystal lens irradiates on an incident surface of the light homogenizing member; and the liquid crystal lens is configured to reduce the divergence angle of the illumination light, so that a cross sectional area of the illumination light, when being incident to a position of the incident surface of the light homogenizing member, is larger than an area of the incident surface, such that the illumination light entering the light homogenizing member has a reduced divergence angle, an increased F number, and reduced luminous flux.

A projection method, including steps of:

receiving image data including a plurality of grayscale values, each of which corresponds to one pixel;

increasing grayscale values of a plurality of pixels of the image data;

providing illumination light, and reducing luminous flux of the illumination light, wherein a reduction ratio of the luminous flux of the illumination light matches an increase ratio of the plurality of grayscale values of the image data;

modulating the illumination light with the reduced luminous flux based on the image data with the increased grayscale values, to generate projection light required for a projection image; and generating a projection image based on the projection light, wherein brightness of the projection light matches the image data prior to increasing the grayscale values.

In an embodiment, in the projection method, when a highest grayscale value of the plurality of pixels in the image data is smaller than a preset value, the grayscale values of the plurality of pixels of the image data is increased; when a highest grayscale value of respective pixels in a subframe image data is larger than or equal to the preset value, grayscale values of the respective pixels of the subframe image data are kept unchanged, the luminous flux of the illumination light is controlled to be standard luminous flux $L_O$, and the illumination light of the standard luminous flux $L_O$ is modulated based on the image data with the unchanged grayscale values to generate the projection light required for the projection image.

In an embodiment, in the projection method, a grayscale maximum value that the projection system using the method can reach is set to be $G_{Max}$, the preset value is set to be $G_R$, and the preset value $G_R$ is smaller than or equal to the grayscale maximum value $G_{Max}$.

In an embodiment, in the projection method, the preset value is set to be 90% of the grayscale maximum value $G_{Max}$.

In an embodiment, in the projection method, an adjustment coefficient k is calculated when the highest grayscale value of the respective pixels in the subframe image data is smaller than the preset value, wherein the adjustment coefficient k is equal to $G_{Max}/G_L$, and $G_L$ represents the highest grayscale value of the respective pixels in the subframe image data.

In an embodiment, in the projection method, a grayscale value of each of pixels of the image data is adjusted to be k times the grayscale value of each of the plurality of pixels of the image data based on the adjustment coefficient k, that is, a grayscale value of any one of the plurality of pixels of the image data is set to be Gi, and then an increased grayscale value corresponding to the grayscale value Gi of the pixel of the image data is k×Gi, and the luminous flux of the illumination light is adjusted to be 1/k of the standard luminous flux $L_O$ and thus the luminous flux of the illumination light is $L_O/k$.

Compared with the related art, in the projection system and the projection method, the grayscale values of the pixels of the image data are increased, and the luminous flux of the illumination light is reduced. Then the illumination light with the reduced luminous flux is modulated according to the image data with the increased grayscale values to generate the projection light, and a proportion of the reduction of the luminous flux of the illumination light is adapted to a proportion of the increase of the grayscale value of the image data, so that the original grayscale values of the plurality of pixels of the image data can be accurately restored. In addition, since the increase in the grayscale value results in the increase of the "ON" time duration of each mirror of the DMD, while the "OFF" time duration is reduced, the stray light generated in the "OFF" time duration is reduced and the influence of the stray light on the contrast of the projection system is reduced, thereby improving the contrast of the projection system and the projection method.

SYMBOL DESCRIPTION OF MAIN MEMBERS

Figure 1:
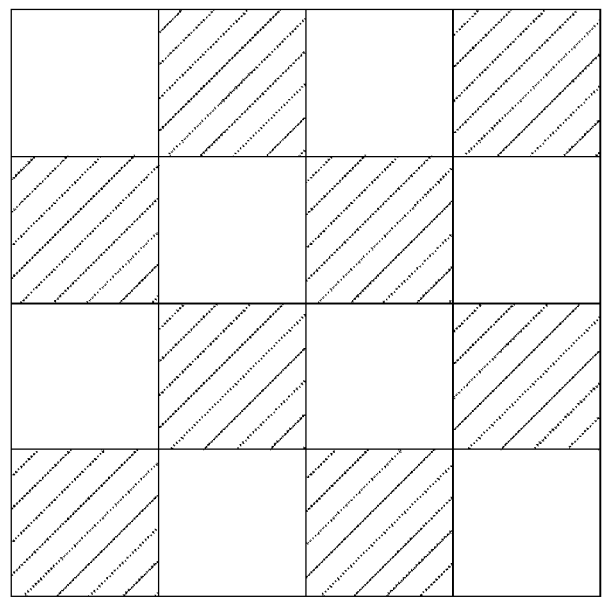
FIG. 1 is a schematic diagram of a test screen for ANSI contrast.

Projection system 100, 200,
Mirror unit 102
Substrate 101
Light emitting device 110
Light source 111
Optical relay system 112
Optical system 113, 223
Light homogenizing device 114
Relay system 115
Relay lens 116
Signal source 120
Signal processor 130
Driving member 140, 240
Adjusting member 150, 250
Step S1-S5

The present disclosure will be further illustrated by the following detailed description with reference to the accompanying drawings.

DESCRIPTION OF EMBODIMENTS

First of all, it should be noted that contrast of a projection system generally refers to a ratio of a full white field center illuminance value to a full black field center illuminance value in a fixed projection image. Normally, in the case of the full black field, a power source can be turned off directly to falsely increase the contrast. Therefore, there is also a definition of ANSI contrast, which is tested as follows. In an image, full black regions and full white regions are alternate to present a form of 4×4 (as shown in FIG. 1), and the test is performed under this image to obtain ANSI contrast CR. Specifically, the ANSI contrast CR conforms to a following formula:

$$C_R = \frac{\sum_{i=1}^{8}[E_{bright}(i) - E_{la}(i)]}{\sum_{i=1}^{8}[E_{black}(i) - E_{ba}(i)]},$$

Wherein $E_{bright}$ represents the center illuminance of the white region, $E_{black}$ represents the center illuminance of the black region, $E_{la}$ represents center illuminance of ambient light when image projection is not performed in the white region, $E_{ba}$ represents the center illuminance of the ambient light when image projection is not performed in the black region, i represents a serial number of the black region and the white region (the above test image includes a total of 8 black regions and 8 white regions, so i=1 to 8).

Generally, a brightness perception range that is common and suitable in daily life is in a range of about 0.01 nits-1000 nits, and the contrast is about 100000:1, while a range that can be modulated by a normal spatial light modulator is much lower than a perception range of a human eye. It is desirable that the projection display images are as close as possible to the perception of the human eye on natural environment, and HDR technology has been proposed to improve dynamic ranges of projection display systems.

There are generally three ways to improve the contrast: (1) ensuring brightness of a pixel having the highest brightness in one frame of image, and reducing overall brightness of other pixels; (2) ensuring brightness of a pixel having the lowest brightness in one frame of image, and improving overall brightness of other pixels; and (3) ensuring brightness of a certain pixel that has brightness between the highest brightness and the lowest brightness in one frame of image, increasing overall brightness of a pixel having relatively high brightness and reducing overall brightness of a pixel having relatively low brightness. Since the highest brightness of a frame of image is limited by the light source brightness and the optical system transmission efficiency, the method of reducing the brightness of dark pixels to improve the contrast is faster and more flexible.

Figure 2:
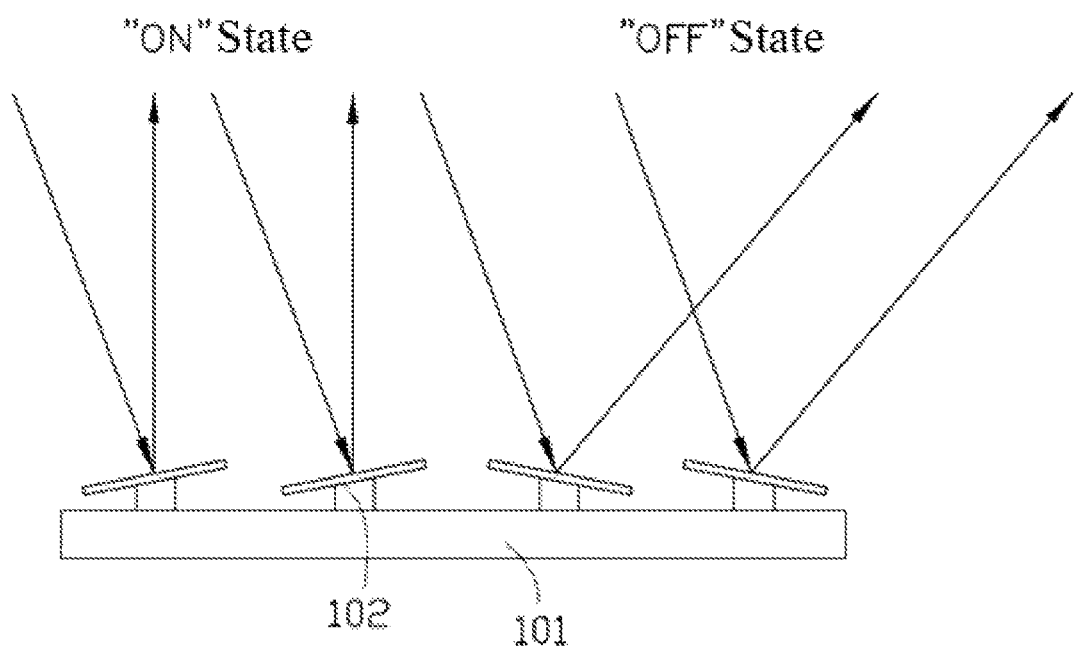
FIG. 2 is a structural schematic diagram of a DMD.

A DMD (Digital Micro-mirror Device) is a commonly used spatial light modulator, and it is an image chip developed by the American TI (Texas Instruments) Company and widely used in the projection display industry. As shown in FIG. 2, FIG. 2 is a structural schematic diagram of a DMD. The DMD includes a substrate 101, and a plurality of mirror units 102 disposed on the substrate 101 and arranged in a matrix. A driving circuit may be disposed inside the substrate 101 (such as a silicon substrate), for controlling the mirror unit 102 to rotate rapidly. Each of the mirror units 102 is a light switch whose switching time is in an order of microseconds. Each of the mirror units 102 may include an "ON" state (i.e., an open state) and an "OFF" state (i.e., a closed state). The human eye actually integrates brightness generated under the "ON" state, and the longer the time duration of the "ON" state is (or the shorter the time duration of the "OFF" state) is, the higher the brightness is. The time duration of the "ON" state or the "OFF" state of each of the mirror units 102 is controlled by a grayscale value of its corresponding pixel, and the higher the grayscale is, the longer the time duration of the "ON" state is, and the shorter the time duration of the "OFF" state is. For example, a pixel has a red grayscale value of 127, and a time occupying ratio of the "OFF" state of the corresponding mirror unit 102 is ½. When the grayscale value is increased to 191, the time occupying ratio of the "OFF" state of the corresponding mirror unit 102 is ¼.

Specifically, when the DMD is in operation, the illumination light is incident on a surface of the DMD at a certain angle. When the mirror unit 102 of the DMD is in the "ON" state, the light reflected by the mirror unit 102 of the DMD enters a lens and is finally projected onto the screen; and when the mirror unit 102 of the DMD is in the "OFF" state, the mirror unit 102 of the DMD is turned over and the reflected light ray is prevented from entering the lens.

Figure 3:
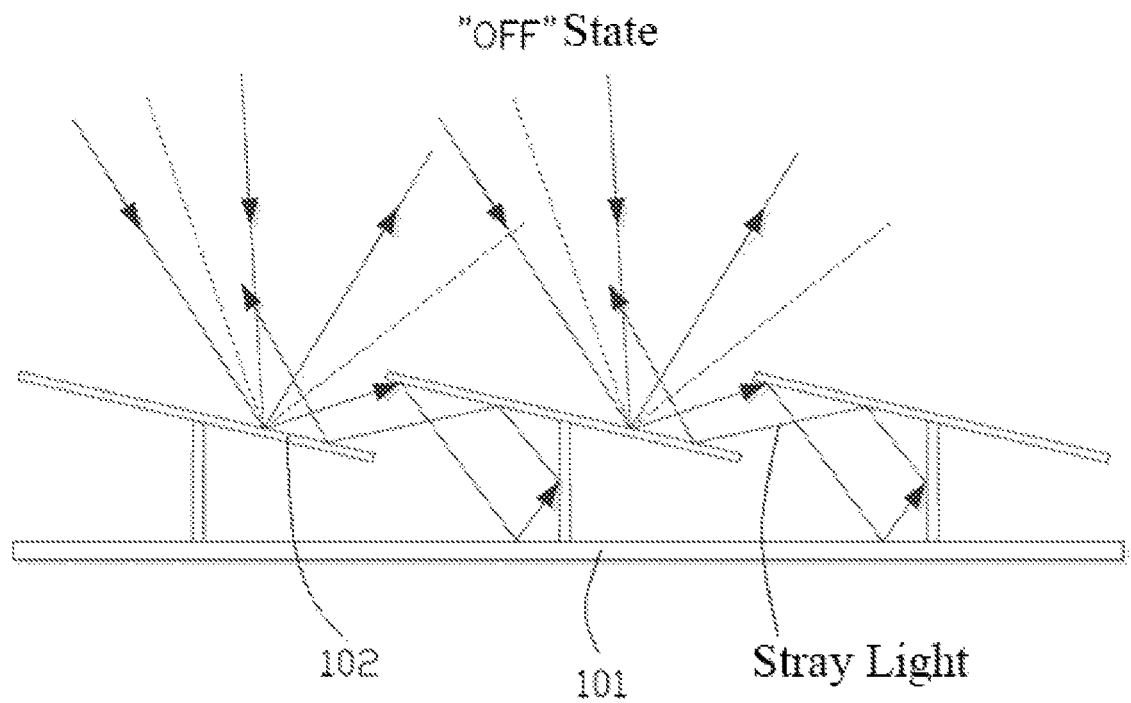
FIG. 3 is a schematic diagram showing an optical path of stray light generated when a mirror unit of a DMD is in an "OFF" state.

However, it has been found by research that when the mirror unit 102 of the DMD is in the "OFF" state, since a gap between the mirror units 102 becomes large, the illumination light is incident on the bottom substrate 101 and repeatedly reflected therein to generate stray light, which enters the lens, thereby ultimately resulting in reduced contrast of the projection system adopting the DMD. Specifically, referring to FIG. 3, FIG. 3 is a schematic diagram of an optical path of the stray light generated when the mirror unit 102 of the DMD is in the "OFF" state. As shown in FIG. 3, the illumination light is incident on the substrate 101 from the gap between two adjacent mirror units 102, and it is repeatedly reflected between the substrate 101 and a back portion of the mirror unit 102 to generate the stray light. The stray light may leak from an edge of the mirror unit 102, thereby resulting in the reduced contrast of the projection system employing the DMD.

Figure 4:
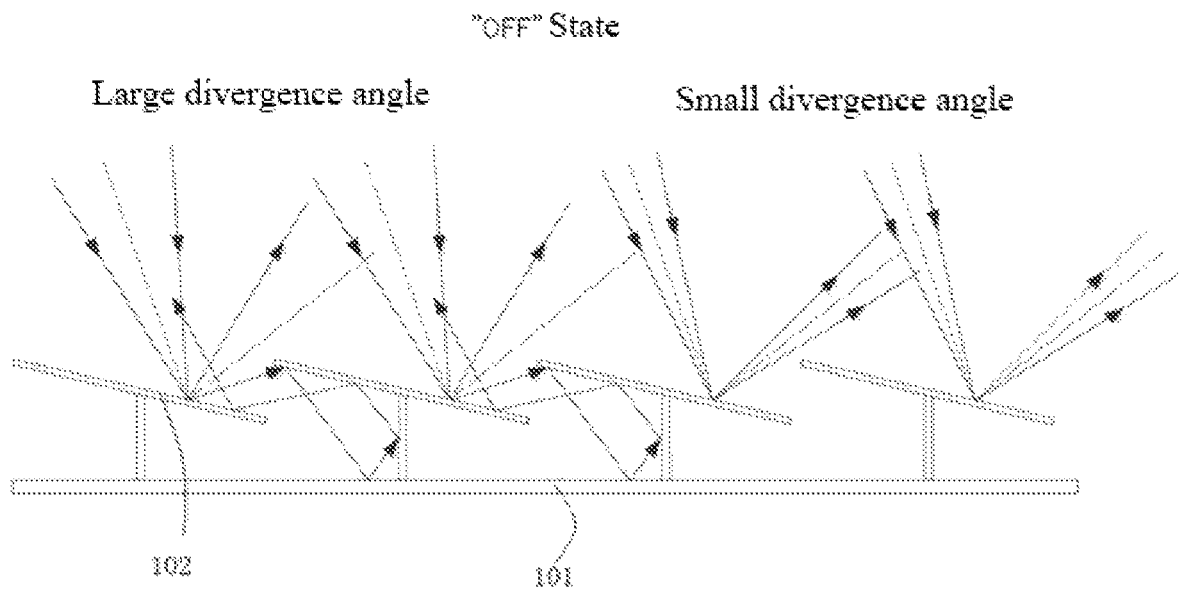
FIG. 4 illustrates a comparison of stray light generated by illumination light, which has different divergence angles, irradiating on the same DMD.
Figure 5:
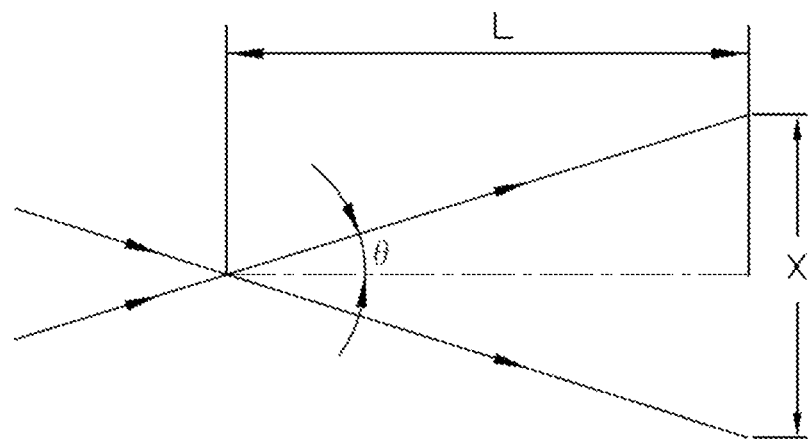
FIG. 5 is a schematic diagram of a definition of a divergence angle of light.

Furthermore, referring to FIG. 4, FIG. 4 illustrates a comparison of stray light generated by the illumination light, which has different divergence angles, irradiating on the same DMD. A left side illustrates a schematic diagram of the stray light generated by illumination light, which has a relatively large divergence angle (a relatively small F number), irradiating on the DMD, and a right side illustrates a schematic diagram of the stray light generated by illumination light, which has a relatively small divergence angle (a relatively large F number), irradiating on the DMD. It would be appreciated that the divergence angle of light is used to measure a speed at which the light beam diverges outwardly from a beam waist. Specifically, the beam divergence angle is a derivative of a beam radius to a far field axial position, that is, a distance from the beam waist is much larger than the Rayleigh length. Referring to FIG. 5, FIG. 5 is a schematic diagram of a definition of the divergence angle, where the divergence angle θ=tan (x/2L), the F number, i.e., F #=1/2 Sin θ, wherein x represents a diameter of a light spot, and L represents a distance from a test source to the light spot.

As shown in FIG. 4, when the mirror unit 102 of the DMD is in the "OFF" state, the gap between the mirror units becomes large, and the illumination light is incident on the bottom substrate 101 thereof and repeatedly reflected therein to form the stray light. The region at which the stray light between the adjacent mirror units 102 is irradiated is a stray light region, and the larger the divergence angle of the illumination light (the smaller the F number) is, there is more stray light, and the larger the influence on the contrast of the projection system is, that is, the more the contrast of the corresponding projection system is lowered. As shown in FIG. 4, in the "OFF" state, the stray light generated by the illumination light having the relatively large divergence angle at the left side is obviously more than the stray light generated by the illumination light having the relatively small divergence angle at the right side. Therefore, the contrast of the projection system corresponding to the illumination light having the relatively large divergence angle at the left side is smaller than the contrast of the projection system corresponding to the illumination light having the relatively small divergence angle at the right side.

Therefore, in order to improve the contrast, when the mirror unit 102 of the DMD is in the "OFF" state, the divergence angle of the illumination light should be controlled to be as small as possible, that is, the luminous flux of the illumination light is controlled to be low and no light enters the lens to be projected onto the screen. That is, eliminating the stray light of the mirror unit 102 of the DMD in the "OFF" state or reducing the time occupying ratio of the "OFF" state thereof (that is, increasing the image signal value or the grayscale value) will help to improve the contrast of the projection system.

Figure 6:
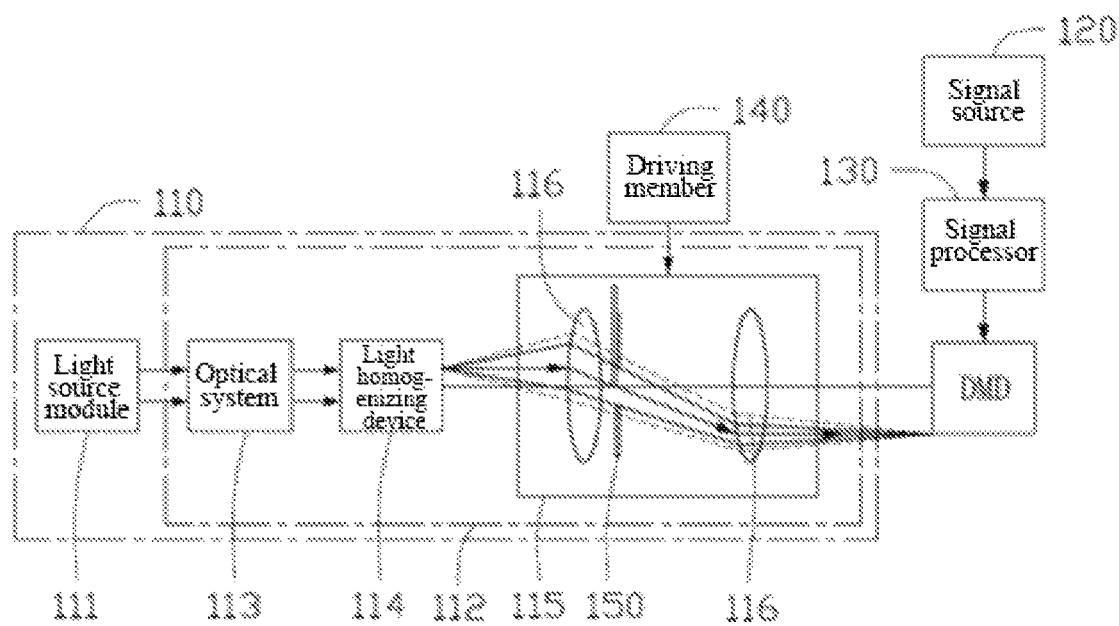
FIG. 6 is a structural schematic diagram of a projection system according to a first embodiment of the present disclosure.

Based on the above analysis, the present disclosure provides a projection system 100 having high dynamic contrast. Referring to FIG. 6, FIG. 6 is a structural schematic diagram of a projection system 100 capable of improving the image contrast according to a first embodiment of the present disclosure. The projection system 100 includes a light emitting device 110, a DMD, a signal source 120, and a signal processor 130. The light emitting device 110 is configured to emit illumination light and provide the illumination light to the DMD. The signal source 120 is configured to provide image data to be displayed to the signal processor 130. The image data includes a plurality of grayscale values, and each grayscale value corresponds to one pixel. The signal processor 130 is configured to increase the grayscale values of a plurality of pixels of the image data and provide image data with the increased grayscale values to the DMD. Standard luminous flux of the illumination light emitted by the light emitting device 110 is Lo. The light emitting device 110 is further configured to reduce the luminous flux of the illumination light when the grayscale values of the plurality of pixels of the image data are increased, such as being adjusted to be smaller than the standard luminous flux $L_O$. A reduction ratio of the luminous flux of the illumination light matches an increase ratio of the grayscale value of the image data. The light emitting device 110 provides the adjusted illumination light to the DMD. The DMD modulates the adjusted illumination light according to the image data with the increased grayscale values, to generate projection light required by the projection image, and the brightness of the projection light matches the image data prior to increasing the grayscale value.

Compared with the related art, in the projection system 100, the signal processor 130 increases the grayscale values of a plurality of pixels of the image data. The light emitting device 110 can reduce the luminous flux of the illumination light. The DMD modulates, according to the image data with the increased grayscale value, the illumination light with reduced luminous flux, to generate projection light. Thus, original grayscale values of a plurality of pixels of the image data can be accurately restored. In addition, since the increase in the grayscale value results in the increase of the "ON" time duration of each mirror of the DMD as well as the reduction of the "OFF" time duration, the stray light generated by in the "OFF" time duration is reduced and the influence of the stray light on the contrast of the projection system is reduced, thereby improving the contrast of the projection system 100.

It can be understood that the light emitting device 110 correspondingly turning down the luminous flux is to adjust, based on the standard luminous flux $L_O$ emitted when the light emitting device 110 does not adjust the luminous flux, the luminous flux of the illumination light to be smaller than the standard luminous flux $L_O$ of the illumination light. When the grayscale value of the respective pixel of the image data has substantially reached a grayscale maximum value and it is difficult to further increase, the signal processor 130 does not need to increase the image data but keeps the grayscale value of the respective pixel of the image data unchanged and provides the image data with the unchanged grayscale value (i.e., the original image data) directly to the DMD. Moreover, the light emitting device 110 directly emits the illumination light of the standard luminous flux $L_O$ to the DMD. The DMD modulates the illumination light of the standard luminous flux $L_O$ according to the original image data to generate the projection light.

Specifically, the image data may be subframe image data. The subframe image data may be red subframe image data, green subframe image data or blue subframe image data. When the highest grayscale value in the respective pixel in the subframe image data is lower than a preset value, the signal processor 130 may increase the grayscale values of the plurality of pixels of the subframe image data and provide the subframe image data with the increased grayscale values to the DMD.

The light emitting device 110 also turns down the luminous flux of the illumination light when the highest grayscale value in the respective pixel of the subframe image data is lower than the preset value, so as to make the luminous flux of the adjusted illumination light be adapted to the image data with the increased grayscale values. Specifically, the light emitting device 110 may include a driving member 140 and an adjusting member 150. The driving member 140 controls the adjusting member 150 to perform luminous flux adjustment on the illumination light emitted by the light emitting device.

In an embodiment, the driving member 140 of the light emitting device 110 may directly analyze the image data to determine, according to the image data, whether the signal processor 130 will increase the grayscale value of the respective pixel of the image data. If the driving member 140 of the light emitting device 110 determines, according to the image data, that the signal processor 130 will increase the grayscale value of the respective pixel of the image data, and then the driving member 140 of the light emitting device 110 controls the adjusting member 150 to correspondingly reduce the luminous flux of the illumination light. Specifically, the driving member 140 of the light emitting device 110 may analyze whether the highest grayscale value in the respective pixel of the image data is lower than a preset value, and when the highest grayscale value in the respective pixel of the image data is lower than the preset value, the driving member 140 of the light emitting device 110 controls the adjusting member 150 to correspondingly reduce the luminous flux of the illumination light.

In another embodiment, the driving member 140 of the light emitting device 110 can receive a luminous flux adjustment control signal sent when the signal processor 130 turns up grayscale values of respective pixels of the image data, and then the driving member 140 of the light emitting device 110 can control, according to the luminous flux adjustment signal sent by the signal processor 130, the adjusting member 150 to reduce the luminous flux of the illumination light. Specifically, the signal processor 130 may analyze whether the highest grayscale value in the respective pixel of the image data is smaller than the preset value. When the highest grayscale value in the respective pixel of the image data is smaller than the preset value, the signal processor 130 increases the grayscale values of the plurality of pixels of the image data, provides the image data with the increased grayscale values to the DMD and also transmits the luminous flux adjustment signal to the driving member 140 of the light emitting device 110, such that the driving member 140 of the light emitting device 110 correspondingly control the adjusting member 150 to reduce the luminous flux of the illumination light according to the luminous flux adjustment signal. When the highest grayscale value of the respective pixel in the subframe image data is larger than or equal to the preset value, the signal processor 130 keeps the grayscale value of the respective pixel of the subframe image data unchanged and provides the subframe image data to the DMD. The light emitting device 110 emits the illumination light of the standard luminous flux $L_O$, and the DMD modulates, according to the subframe image data with the unchanged grayscale value, the illumination light of the standard luminous flux $L_O$, to generate projection light required for the projection image.

Specifically, it is assumed that the projection system 100 can display a grayscale ranging from 0 to $G_{Max}$, such as 0 to $(2^m-1)$ grayscale, where m may be 8, the grayscale range may be 0 to 255 grayscale, and $G_{Max}$ represents a grayscale maximum value that the projection system 100 can display. The signal processor 130 may analyze the highest grayscale value $G_L$ in the respective pixel of the image data, and it can be understood that the highest grayscale value is generally smaller than or equal to the grayscale maximum value $G_{Max}$, and the highest grayscale value $G_L$ is compared with the preset value $G_R$. The preset value $G_R$ may also be smaller than or equal to the grayscale maximum value $G_{Max}$. For example, the preset value is 90% of the grayscale maximum value $G_{Max}$, that is, when the grayscale maximum value is 255 grayscale, the preset value may be 230 grayscale. When the highest grayscale value $G_L$ is smaller than the preset value $G_R$, the signal processor 130 calculates an adjustment coefficient k, increases the grayscale value of the respective pixel of the image data according to the adjustment coefficient k, and provides the image data with the increased grayscale values to the DMD. Specifically, the adjustment coefficient k may be equal to the maximum grayscale value $G_{Max}$/the highest grayscale value $G_L$. Since the highest grayscale value $G_L$ of the image data is generally smaller than the maximum grayscale value $G_{Max}$, k is larger than or equal to 1, and the signal processor adjusts the grayscale value of the respective pixel of the image data to be k times. It is assumed that the original grayscale value of any one of the pixels in the image data is $G_i$, then the adjusted grayscale value of the pixel is $kG_i$.

Specifically, the driving member 140 of the light emitting device 110 may control, according to the adjustment coefficient k, the adjusting member 150 to adjust the luminous flux of the illumination light to be adapted to the increased grayscale value of the respective pixel of the image data. The signal processor 130 may send, according to the adjustment coefficient k, the luminous flux adjustment signal representing the adjustment coefficient k to the driving member of the light emitting device. The driving member 140 of the light emitting device 110 may control, according to the adjustment coefficient k, the adjusting member 150 to adjust the luminous flux of the illumination light to be adapted to the increased grayscale value of the respective pixel of the image data. Specifically, the standard luminous flux $L_O$ of the illumination light emitted by the light emitting device 110 can also be regarded as the luminous flux of the illumination light normally emitted by the light emitting device 110, that is, the luminous flux when k=1. In other words, the projection light obtained by the DMD modulating the illumination light of the standard luminous flux $L_O$ according to the original grayscale value of the image data can exactly restore the grayscale of the image data. The light emitting device 110 adjusting the luminous flux of the illumination light according to the adjustment coefficient k is to adjust the luminous flux of the illumination light to be 1/k of the original luminous flux. That is, the adjusted luminous flux emitted by the light emitting device 110 is 1/k of the standard luminous flux, i.e., $L_O$/k. Each of the mirror units of the DMD receives the illumination light having the luminous flux of $L_O$/k and modulates the illumination light having the luminous flux of $L_O$/k according to the adjusted grayscale value $kG_i$, to generate projection light. The luminous flux of the projection light is $kG_i*L_O$/k, which is the same as the luminous flux $G_i*L_O$ that is obtained by modulating the original luminous flux $L_O$ according to the original grayscale value $G_i$. The projection light emitted by each of the mirror units of the DMD accurately restores the grayscale value of the respective pixel of the image data.

Without doubt, in a modified embodiment, the adjustment coefficient k can also be selected according to actual needs. For example, when the grayscale values of the respective pixels of the image data are all smaller than $(G_{Max}+1)/2$, the adjustment coefficient k may also be set to 2 times, i.e., k=2. Taking data on one frame of image as an example for description, the data includes red subframe image data, green subframe image data, and blue subframe image data. Assuming that in the image on one frame of image, an original red grayscale value, an original green grayscale value and an original blue grayscale value of one pixel are respectively (50, 60, 80), and an adjustment system can be set to 2 times. Therefore, the signal processor 130 adjusts, according to the adjustment coefficient, the red grayscale value, the green grayscale value, and the blue grayscale value of the pixel to twice the original ones, i.e., (100, 120, 160), and the luminous flux of the illumination light can be adjusted to half of the original illumination light, i.e., 50%, and the grayscale of the image data is also accurately restored.

Further, as shown in FIG. 6, the light emitting device 110 may include a light source module 111 and an optical relay system 112. The light source module 111 emits illumination light. The optical relay system 112 is used to perform processing, such as changing an optical path, light homogenizing and the like, on the illumination light and provide the processed illumination light to the DMD.

In an embodiment, the light emitting device 110 can change the luminous flux of the illumination light, i.e., providing the adjusting member 150 in the light source module 111, and the adjusting member 150 can be a light source driving circuit configured to adjust a driving current of a light emitting element (such as a laser) of the light source module 111 so as to change the luminous flux of the illumination light. However, in another embodiment, the light emitting device 110 may also adjust the luminous flux of the illumination light by changing the divergence angle (or the F number of the illumination light) of the illumination light through the optical relay system 112, i.e., providing the adjusting member 150 in the optical relay system 112; or, in still another embodiment, the light emitting device 110 adjusts the luminous flux of the illumination light by changing the luminous flux of the illumination light emitted by the light source module) and changing the divergence angle of the illumination light (or the F number of the illumination light) in the optical relay system 112, and provides the adjusting member 150 respectively in the light source module 111 and the optical relay system 112. Specifically, the light emitting device 110 can reduce the divergence angle of the illumination light provided by the optical relay system 112, increase the F number of the illumination light provided by the optical relay system 112, and reduce the luminous flux of the illumination light provided by the optical relay system 112.

In the present embodiment, the case where the optical relay system 112 of the light emitting device 110 adjusts the luminous flux of the illumination light by changing the divergence angle of the illumination light (or the F number of the illumination light) is mainly taken as an example for description. Specifically, it is assumed that when the luminous flux of the illumination light emitted by the light emitting device 110 is the standard luminous flux $L_O$, a reference divergence angle of the illumination light emitted by the light emitting device 110 is $\theta_0$ (its corresponding F number is the reference F number $F_o$). When the grayscale value of the respective pixel of the image data is increased, the light emitting device 110 adjusts, according to the adjustment coefficient, the divergence angle of the illumination light to be smaller than the reference divergence angle (or adjust the F number of the illumination light to be larger than the reference F number $F_o$), and a ratio between the divergence angle of the adjusted illumination light and the reference divergence angle is inversely proportional to the adjustment coefficient (a ratio between the F number of the adjusted illumination light and the reference F number $F_o$ is directly proportional to the adjustment coefficient k), that is, the larger the adjustment coefficient k is, the smaller the ratio between the divergence angle of the adjusted illumination light and the reference divergence angle is (the larger the ratio between the F number of the adjusted illumination light and the reference F number $F_o$ is), that is, the smaller the divergence angle of the adjusted illumination light is (the larger the F number of the adjusted illumination light) is.

In other words, from a viewpoint of the F number adjustment, the light emitting device 110 can adjust the luminous flux of the illumination light by changing the F number of the illumination light. Specifically, it is assumed that when the luminous flux of the illumination light emitted by the light emitting device is the standard luminous flux $L_O$, the corresponding F number of the illumination light emitted by the light emitting device 110 is the reference F number $F_o$. When the grayscale value of the respective pixel of the image data is increased, the light emitting device 110 adjusts the F number of the illumination light to be larger than the reference F number $F_o$ according to the adjustment coefficient, and a ratio between the F number of the adjusted illumination light and the reference F number $F_o$ is directly proportional to the adjustment coefficient k, that is, the larger the adjustment coefficient k is, the smaller the ratio between the divergence angle of the adjusted illumination light and the reference divergence angle is, and the larger the ratio of the F number of the adjusted illumination light to the reference F number $F_o$ is, so that the divergence angle of the adjusted illumination light becomes smaller, and the F number of the adjusted illumination light becomes larger.

Specifically, the adjusting member 150 is disposed in the optical relay system 112. When the grayscale value of the respective pixel of the image data is increased, the adjusting unit 150 adjusts the divergence angle (or the F number) of the illumination light emitted by the optical relay system 112, increases the F number of the illumination light provided by the optical relay system, and reduces the luminous flux of the illumination light provided by the optical relay system, such that the luminous flux of the illumination light is adapted to the image data with the increased grayscale value, and thus the luminous flux of the illumination light is adapted to the image data with the increased grayscale value.

It can be understood that, according to the analysis of FIG. 4, the larger the divergence angle of the stray light irradiating on the mirror unit 102 of the DMD is (that is, the smaller the F number is), the larger the stray light region is, and the larger the influence of the stray light on the contrast of the projection system is. In the present embodiment, by reducing the divergence angle of the adjusted illumination light (increasing the F number), it is not only possible to reduce the luminous flux and increase the "ON" time duration of the mirror unit 102 (decreasing the "OFF" time duration) so as to reduce the stray light, and it is also possible to reduce the stray light region by reducing the divergence angle, thereby further improving the contrast.

Referring to FIG. 6 again, in the present embodiment, the optical relay system 112 further includes an optical system 113, a light homogenizing device 114, and a relay system 115 that are sequentially disposed.

The light source module 111 emits the illumination light to the optical system 113. The light source module 111 can include a light emitting element and a wavelength conversion element. The light emitting element is configured to emit exciting light. The wavelength conversion element can be a color wheel on which a wavelength conversion material such as a fluorescent material (red, yellow, green fluorescent material, etc.) is disposed. The wavelength conversion element is configured to receive the exciting light, convert a portion of the exciting light into excited light, and then emit the excited light and the other portion of the exciting light as the illumination light. The light emitting element can include a laser light source, such as a blue laser light source, and the exciting light can include laser light, such as blue laser light.

The optical system 113 is configured to perform processing such as collecting on the illumination light emitted by the light source module 111 and direct the illumination light to the light homogenizing device 114.

The light homogenizing device 114 is configured to homogenize the illumination light from the optical system 113 and provide the homogenized illumination light to the relay system 115. The light homogenizing device 114 can include a light homogenizing square rod. The illumination light from the optical system 113 enters the square rod through an entrance of the square rod, the illumination light is reflected or total internally reflected by an inner wall mirror surface of the square rod, and then the homogenized illumination light exits from an exit of the square rod. It will be appreciated that in a modified embodiment, the light homogenizing device 114 can also include a fly-eye lens.

The relay system 115 is configured to provide the homogenized illumination light to the DMD. Specifically, the relay system 115 mainly includes some relay lenses 116, for providing the illumination light of the light homogenizing device 114 (the square rod or the fly-eye) to the surface of the DMD at a certain angle. In this embodiment, the adjusting member 150 may be disposed in the relay system 115. Specifically, the adjusting member 150 is an adjustable aperture for changing the divergence angle, the F number and the luminous flux of the illumination light, and the adjustable aperture can be disposed at an aperture stop of the relay system 115. The adjustable aperture is used for blocking a peripheral portion of the light beam of the illumination light incident to the adjustable aperture, in order to reduce the divergence angle, increase the F number and reduce the luminous flux of the illumination light exiting from the adjustable aperture with respect to the incident illumination light. The driving member 140 can include a driving motor, and the driving motor can drive the adjustable aperture to control the divergence angle, the F number, and the luminous flux of the illumination light. Further, it can be understood that a magnitude of the reduction of the divergence angle and a magnitude of the increase of the F number depend on a magnitude of the luminous flux required to be reduced, and in the present embodiment, they depend on an amount of the illumination light that is incident to the adjustable aperture while being blocked by the adjustable aperture, i.e., an aperture size of the adjustable aperture. In other words, it is needed to calculate how many degrees the divergence angle needs to be reduced based on a magnitude of the reduction in the luminous flux, so as to adjust the aperture size of the adjustable aperture in such a manner that the adjustable aperture controls the divergence angle to reach an angle that needs to be adjusted to.

Specifically, the relay system 115 includes a relay lens 116. It can be seen from a main optical axis of an edge ray of the light homogenizing device 114 (e.g., the square bar) that a position where the main optical axis of the edge ray emitted by the light homogenizing device 114 and a central axis of the relay system 115 intersect is the position of the aperture stop. Specifically, the center of the adjustable aperture of the adjusting member 150 and the central axis of the relay system 115 coincide and are arranged perpendicularly. The position of the main optical axis of the edge ray emitted by the light homogenizing device 114 may be defined by the relay lens 116. For example, an upper edge ray of the light homogenizing device 114 is exactly incident to a position of a lower edge of the DMD after passing through the relay lens 116, while a lower edge ray of the light homogenizing device 114 is exactly incident to the position of the upper edge of the DMD after passing through the relay lens 116, such that the light spot emitted by the light homogenizing device 114 is exactly imaged, via the relay lens 116, to surfaces of the DMD having respective mirrors. In addition, it can be understood that the adjustable aperture of the adjusting member 150 may have an actual thickness, which, however, has little impact on the adjustment of the F number and can be ignored, so the potential influence of the actual thickness of the adjustable aperture is not considered here, as long as there is coincidence between the position of the adjustable aperture and the position of the aperture stop.

Figure 7:
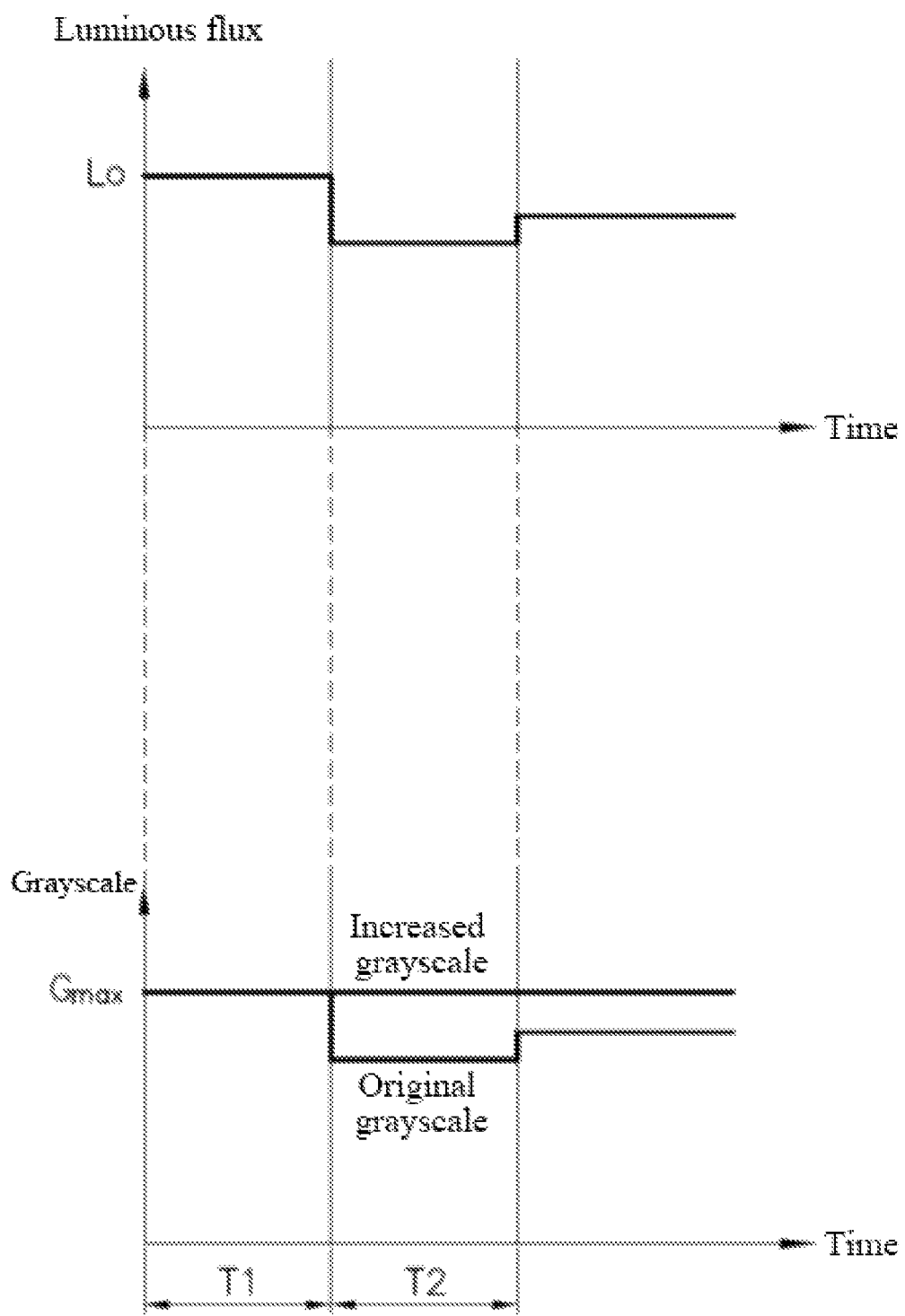
FIG. 7 is a schematic diagram of a projection time-sequence of a projection system of FIG. 6.

Referring to FIG. 7. FIG. 7 is a time-sequence diagram of an operation of the projection system 100. When the projection system 100 is in operation, the signal source 120 provides the image data to be displayed to the signal processor 130. The signal processor 130 analyzes the image data. It is assumed that the image data includes first subframe image data and second subframe image data. The highest grayscale value of a plurality of pixels of the first subframe image data reaches the grayscale maximum value $G_{Max}$ (e.g., 255 grayscale), that is, being greater than or equal to the preset value (e.g., 230 grayscale). The highest grayscale value (e.g., 228 grayscale) of a plurality of pixels of the second subframe image data does not reach the grayscale maximum value $G_{Max}$ (e.g., 255 grayscale) and is also smaller than the preset value (e.g., 230 grayscale), that is, being smaller than or equal to the preset value (e.g., 230 grayscale).

In a first subframe modulation time T1, the signal processor 130 determines, according to the highest grayscale value (e.g., 255 grayscale) of the plurality of pixels of the first subframe image data, that the first subframe image data does not need to have the grayscale increased, and the signal processor 130 provides the first subframe image data (i.e., the original first subframe image data) to the DMD in a first time period. Moreover, the driving member 140 also judges or receives, according to the image data, the signal output by the signal processor 130, so as to get that the adjustment of the luminous flux is not required. The driving member 140 controls the adjusting member 150 in such a manner that the luminous flux of the illumination light is maintained at the standard luminous flux $L_O$ and provides the illumination light of the standard luminous flux $L_O$ to the DMD. The DMD modulates the illumination light of the standard luminous flux $L_O$ according to the original first subframe image data, to obtain the projection light.

In the second subframe modulation time T2, the signal processor 130 determines, according to the highest grayscale values of the plurality of pixels of the second subframe image data (e.g., 228 grayscale, which is lower than the preset value of 230 grayscale), that the first subframe image data needs to have the grayscale increased. The signal processor 130 calculates, according to the highest grayscale value, a modulation coefficient k, k=the grayscale maximum value/the highest grayscale value, multiplies the grayscale value of the respective pixel of the second subframe image data by the modulation coefficient k to obtain the grayscale value of the respective pixel of the increased second subframe image data, and provides the second subframe image data having the increased grayscale to the DMD. Moreover, the driving member 140 also determines or receives, according to the image data, the signal output by the signal processor 130, to get that the luminous flux needs to be adjusted. The driving member 140 controls the adjusting member 150 in such a way that the luminous flux of the illumination light is adjusted to be 1/k of the standard luminous flux $L_O$, and provides the illumination light having luminous flux that is only 1/k of the standard luminous flux $L_O$ to the DMD. The DMD modulates, according to the second subframe image data having the increased grayscale, the illumination light having the luminous flux of $L_O/k$ to obtain the projection light.

According to the above analysis, the signal processor 130 increases the grayscale values of the plurality of pixels of the image data, and the light emitting device 110 reduces the luminous flux of the illumination light. The DMD modulates, according to the image data with the increased grayscale value, the illumination light with the reduced luminous flux to generate the projection light. The reduction ratio of the luminous flux of the illumination light is adapted to the increase ratio of the grayscale value of the image data. Thus, the original grayscale values of the plurality of pixels of the image data can be accurately restored. In addition, since the increase in the grayscale value results in the increase of the "ON" time duration of each mirror of the DMD, while the "OFF" time duration is reduced, the stray light generated by in the "OFF" time duration is reduced and the influence of the stray light on the contrast of the projection system 100 is reduced, thereby improving the contrast of the projection system 100.

Figure 8:
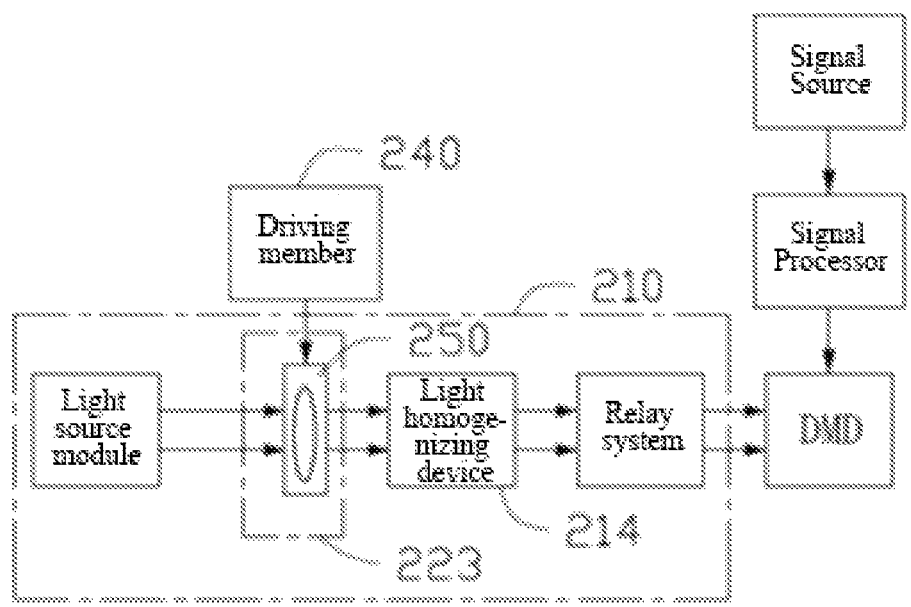
FIG. 8 is a structural schematic diagram of a projection system according to a second embodiment of the present disclosure.

Referring to FIG. 8. FIG. 8 is a structural schematic diagram of a projection system 200 capable of improving image contrast according to a second embodiment of the present disclosure. The projection system 200 of the second embodiment is substantially the same as the projection system 100 of the first embodiment. That is, the description of the projection system 100 of the first embodiment is basically applicable to the projection system 200 of the second embodiment, and a difference between the two mainly lies in that in the second embodiment, the adjusting member 250 is disposed in the optical system 223, and the adjusting member 250 is a liquid crystal lens. The driving member 240 controls the divergence angle, the F number, and the luminous flux of the illumination light through the liquid crystal lens. It can be understood that the liquid crystal lens may be the last lens of the optical system, and the driving member 240 can control arrangement of liquid crystals in the liquid crystal lens by change in a driving voltage, such that a refractive index of the liquid crystal lens is changed, and a focal length of the liquid crystal lens is also changed, thereby changing the divergence angle, the F number, and the luminous flux of the illumination light.

In this embodiment, when the luminous flux of the light emitting device 210 is adjusted to be smaller than the standard luminous flux $L_O$, an area of a cross section of a light beam of the illumination light incident to a position of an incident surface of the light homogenizing device 214 is larger than an area of the incident surface of the light homogenizing device 214. That is, the adjusting member 250 adjusts the area of the cross section of the light beam of the illumination light incident to the position of the incident surface of the light homogenizing device 214, in such a manner that the area of the cross section of the light beam of the illumination light is greater than the area of the incident surface of the light homogenizing device 214, so as to achieve that the luminous flux of the illumination light is adjusted to be smaller than the standard luminous flux. Further, it can be understood that the magnitude of the reduction of the divergence angle and the magnitude of the increase of the F number depend on the magnitude of the required reduction of the luminous flux. In other words, it is needed to calculate, according to the magnitude of the reduction of the luminous flux, how many degrees the divergence angle needs to be reduced, so that the area of the cross section of the light beam exceeds the area of the incidence surface of the light homogenizing device 214.

Figure 9:
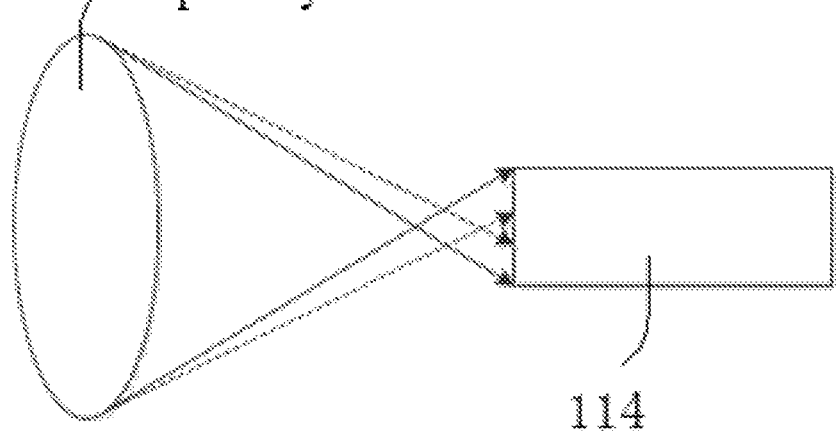
FIG. 9 is a schematic diagram showing adjustment of illumination light by an adjusting member shown in FIG. 8.

It should be noted that both the focal lengths of the liquid crystal lens before and after the adjustment are larger than the distance between the liquid crystal lens and the incident surface of the light homogenizing member 114. Because, if smaller, turning down the divergence angle of the illumination light cannot increase the cross section of the light beam incident on the incident surface of the light homogenizing member 114. As shown in FIG. 9, if the focal length of the liquid crystal lens is smaller than the distance between the liquid crystal lens and the light homogenizing member 114, then after the divergence angle of the illumination light is reduced, the cross section of its light spot incident on the incident surface of the light homogenizing device 114 becomes smaller instead.

Referring to FIG. 9, FIG. 9 is a flow chart diagram of a projection method of the present disclosure. The projection method of the present disclosure can be applied to the projection systems 100 and 200 of the first and second embodiments described above. Specifically, the projection method can include following steps S1, S2, S3, S4, and S5.

At Step S1, image data is received. The image data includes a plurality of grayscale values, and each grayscale value corresponds to one pixel. Specifically, as shown in FIG. 6, the step S1 can be performed by the signal processor 130. That is, the signal processor 130 can receive the image data sent by the signal source 120.

At Step S2, the grayscale values of the plurality of pixels of the image data are increased.

Specifically, in the step S2, the grayscale values of respective pixels of the image data can be analyzed. When the highest grayscale value of the respective pixels of the image data is smaller than a preset value, the grayscale values of the respective pixels of the image data are increased. Specifically, the step S2 can be performed by the signal processor 130. That is, the signal processor 130 receives the image data sent by the signal source 120 and analyzes the highest grayscale value of the respective pixels of the image data. When the highest grayscale value of the respective pixels of the image data is smaller than the preset value, the signal processor 130 increases the grayscale values of the respective pixels of the image data. Specifically, the image data can be subframe image data. The subframe image data may be red subframe image data, green subframe image data or blue subframe image data. When the highest grayscale value in the respective pixels in the subframe image data is lower than the preset value, the signal processor 130 can increase the grayscale values of the respective pixels of the subframe image data and provide the subframe image data with the increased grayscale values to the DMD.

Specifically, it is assumed that the projection system 100, 200 using the projection method can display a grayscale range of 0 to $G_{Max}$, such as 0 to $(2^m-1)$ grayscale, where m can be 8, the grayscale range may be 0 to 255 grayscale, and $G_{Max}$ represents a grayscale maximum value that the projection system 100, 200 can display. The signal processor 130 can analyze the highest grayscale value $G_L$ in the respective pixels of the image data. It can be understood that the highest grayscale value is generally smaller than or equal to the grayscale maximum value $G_{Max}$, and the highest grayscale value $G_L$ is compared with the preset value $G_R$. The preset value $G_R$ may also be smaller than or equal to the grayscale maximum value $G_{Max}$. For example, the preset value is 90% of the grayscale maximum value $G_{Max}$, that is, when the grayscale maximum value is 255 grayscale, the preset value may be 230 grayscale. When the highest grayscale value $G_L$ is smaller than the preset value $G_R$, the step S2 can further include following steps of: calculating an adjustment coefficient, increasing the grayscale values of the respective pixels of the image data according to the adjustment coefficient, and providing the image data with the increased grayscale values to the DMD. Specifically, the adjustment coefficient k can be equal to the maximum grayscale value $G_{Max}$/the highest grayscale value $G_L$. Since the highest grayscale value $G_L$ of the image data is generally smaller than the maximum grayscale value $G_{Max}$, k is greater than or equal to 1. The signal processor 130 performs control in such a manner that a grayscale value of each pixel of the image data is adjusted to be k times. It is assumed that an original grayscale value of any one pixel of the image data is $G_i$, then the adjusted grayscale value of the pixel is $kG_i$.

Without doubt, in a modified embodiment, the adjustment coefficient k can also be selected according to actual needs. For example, when the grayscale values of the respective pixels of the image data are all smaller than $(G_{Max}+1)/2$, the adjustment coefficient k can also be set to 2 times, i.e., k=2. Taking image on one frame of image as an example for description, the data one the one frame of the image includes red subframe image data, green subframe image data, and blue subframe image data. Assuming that in the data on the one frame of image, an original red grayscale value, an original green grayscale value and an original blue grayscale value of one pixel are respectively (50, 60, 80), and an adjustment coefficient can be set to 2 times. Therefore, the signal processor 130 adjusts, according to the adjustment coefficient, the red grayscale value, the green grayscale value, and the blue grayscale value of the pixel to twice the original ones, i.e., (100, 120, 160), and the luminous flux of the illumination light can be adjusted to half of the original illumination light, i.e., 50%, and the grayscale of the image data is also accurately restored.

At Step S3, the illumination light is provided, and the luminous flux of the illumination light is reduced. A ratio by which the luminous flux of the illumination light is reduced is adapted to a ratio by which the grayscale value of the image data is increased. Specifically, the step S3 can be performed by the light emitting device.

At Step S4, the illumination light with the reduced luminous flux is modulated based on the image data with the increased grayscale value, to generate projection light required for the projection image. Specifically, the step S3 can be performed by the DMD.

Specifically, the step S3 can include following steps of: adjusting the luminous flux of the illumination light to be smaller than the standard luminous flux when the highest grayscale value in the respective pixels of the image data is lower than the preset value, in such a manner that the luminous flux of the adjusted illumination light is adapted to the image data with the increased grayscale value. Specifically, the light emitting device 110 can include a driving member 140 and an adjusting member 150, and the driving member 140 controls the adjusting member 150 to perform luminous flux adjustment on the illumination light emitted by the light emitting device 110.

In an embodiment, the driving member 140 of the light emitting device 110 can directly analyze the image data to determine, according to the image data, whether the signal processor 130 will increase the grayscale values of the respective pixels of the image data. If the driving member 140 of the light emitting device 110 determines, according to the image data, that the signal processor 130 will increase the grayscale values of the respective pixels of the image data, then the driving member 140 of the light emitting device 110 controls the adjusting member 150 to correspondingly reduce the luminous flux of the illumination light. Specifically, the driving member 140 of the light emitting device 110 can analyze whether the highest grayscale value in the respective pixels of the image data is lower than the preset value. When the highest grayscale value in the respective pixels of the image data is lower than the preset value, the driving member 140 of the light emitting device 110 controls the adjusting member 150 to correspondingly reduce the luminous flux of the illumination light.

In another embodiment, the driving member 140 of the light emitting device 110 can receive a luminous flux adjustment control signal sent when the signal processor 130 turns up the grayscale values of the respective pixels of the image data is raised, and then the driving member 140 of the light emitting device 110 can control, according to the luminous flux adjustment signal sent by the signal processor 130, the adjusting member 150 to reduce the luminous flux of the illumination light. Specifically, the signal processor 130 can analyze whether the highest grayscale value in the respective pixels of the image data is lower than the preset value. When the highest grayscale value in the respective pixels of the image data is lower than the preset value, the signal processor 130 increases the grayscale values of the plurality of pixels of the image data, provides the image data with the increased grayscale values to the DMD and transmits the luminous flux adjustment signal to the driving member of the light emitting device, such that the driving member 140 of the light emitting device 110 correspondingly controls the adjusting member to reduce the luminous flux of the illumination light according to the luminous flux adjustment signal. Specifically, the driving member 140 of the light emitting device 110 can control, according to the adjustment coefficient k, the adjusting member 150 to adjust the luminous flux of the illumination light to be adapted to the increased grayscale values of the respective pixels of the image data. The signal processor 130 can send, according to the adjustment coefficient k, the luminous flux adjustment signal representing the adjustment coefficient k to the driving member 140 of the light emitting device 110. The driving member 140 of the light emitting device 110 can control, according to the adjustment coefficient k, the adjusting member 150 to adjust the luminous flux of the illumination light to be adapted to the increased grayscale value of the respective pixel of the image data.

Further, in an embodiment, as shown in FIG. 7, the adjusting member 150 can be an adjustable aperture disposed in the relay system 115 of the light emitting device 110, and it is used to change the divergence angle of the illumination light (or the F number of the illumination light), and the adjustable aperture can be disposed at an aperture stop of the relay system 115. The adjustable aperture is used for blocking a peripheral portion of the light beam of the illumination light incident to the adjustable aperture, so as to reduce the divergence angle, increase the F number and reduce the luminous flux of the illumination light emitted from the adjustable aperture with respect to the incident illumination light. The driving member 140 can include a driving motor, and the driving motor can drive the adjustable aperture to control the divergence angle of the illumination light. Further, it can be understood that a magnitude of the reduction of the divergence angle and a magnitude of the increase of the F number depend on a magnitude of the luminous flux required to be reduced, and in the present embodiment, they depend on an amount of the illumination light that is incident to the adjustable aperture while being blocked by the adjustable aperture, i.e., an aperture size of the adjustable aperture. In other words, it is needed to calculate how many degrees the divergence angle needs to be reduced according to a magnitude of the reduction in the luminous flux so as to adjust the aperture size of the adjustable aperture, such that the adjustable aperture controls the divergence angle to reach an angle that needs to be adjusted to.

Specifically, the relay system 115 includes a relay lens 116. It can be seen from a main optical axis of an edge ray of the light homogenizing device 114 (e.g., the square bar) that a position where the main optical axis of the edge ray emitted by the light homogenizing device 114 and a central axis of the relay system 115 intersect is the position of the aperture stop. Specifically, the center of the adjustable aperture and the central axis of the relay system 115 coincide and are arranged perpendicularly. The position of the main optical axis of the edge ray emitted by the light homogenizing device 114 may be defined by the relay lens 116. For example, an upper edge ray of the light homogenizing device 114 is exactly incident to a position of a lower edge of the DMD after passing through the relay lens 116, while a lower edge ray of the light homogenizing device 114 is exactly incident to the position of the upper edge of the DMD after passing through the relay lens 116, such that the light spot emitted by the light homogenizing device is exactly imaged, via the relay lens 116, to surfaces of the DMD having the respective mirrors. In addition, it can be understood that the adjustable aperture may have an actual thickness, which, however, has little impact on the adjustment of the F number and can be ignored, so the potential influence of the actual thickness of the adjustable aperture is not considered here, as long as there is coincidence between the position of the adjustable aperture and the position of the aperture stop.

In another embodiment, as shown in FIG. 8, the adjusting member 150 can be disposed in an optical system 113, and the adjusting member 150 is a liquid crystal lens. The driving member 140 controls the divergence angle, the F number, and the luminous flux of the illumination light through the liquid crystal lens. It can be understood that the liquid crystal lens can be the last lens of the optical system, and the driving member 140 can control arrangement of liquid crystals in the liquid crystal lens by change in a driving voltage, such that a refractive index of the liquid crystal lens is changed, and a focal length of the liquid crystal lens is also changed, thereby changing the divergence angle, the F number, and the luminous flux of the illumination light.

In this embodiment, when the luminous flux of the light emitting device 210 is adjusted to be smaller than the standard luminous flux $L_O$, an area of a cross section of a light beam of the illumination light incident to a position of an incident surface of the light homogenizing device 214 is larger than an area of the incident surface of the light homogenizing device 214. That is, the adjusting member 250 adjusts the area of the cross section of the light beam of the illumination light incident to the position of the incident surface of the light homogenizing device 214, in such a manner that the area of the cross section of the light beam of the illumination light is greater than the area of the incident surface of the light homogenizing device 214, so as to achieve that the luminous flux of the illumination light is adjusted to be smaller than the standard luminous flux. Further, it can be understood that the magnitude of the reduction of the divergence angle and the magnitude of the increase of the F number depend on the magnitude of the required reduction of the luminous flux. In other words, it is needed to calculate, according to the magnitude of the reduction of the luminous flux, how many degrees the divergence angle needs to be reduced, so that the area of the cross section of the light beam exceeds the area of the incidence surface of the light homogenizing device 214.

Figure 10:
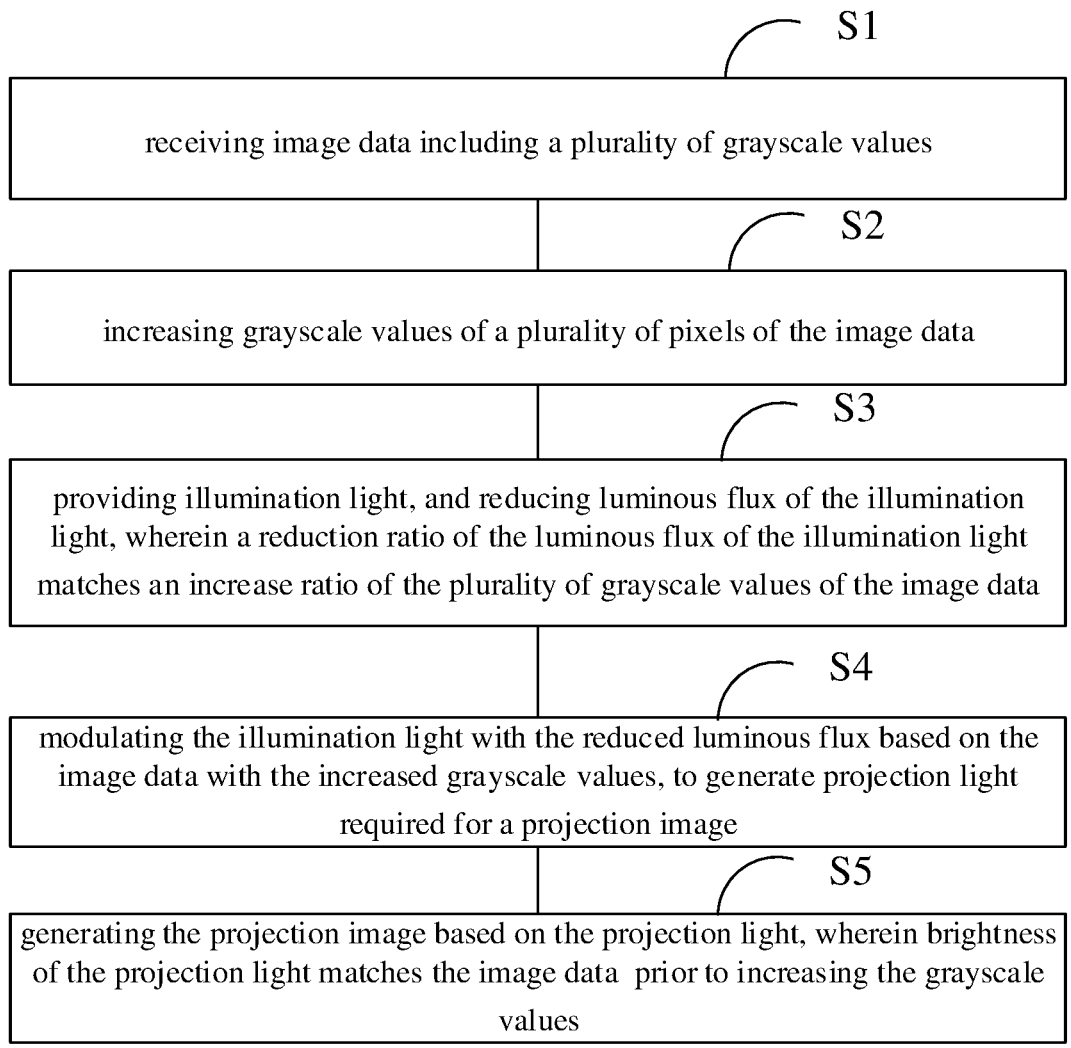
FIG. 10 is a flow chart of a projection method of the present disclosure.

It should be noted that both the focal lengths of the liquid crystal lens before and after the adjustment are larger than the distance between the liquid crystal lens and the incident surface of the light homogenizing member 114. Because, if smaller, turning down the divergence angle of the illumination light cannot increase the cross section of the light beam incident on the incident surface of the light homogenizing member 114. As shown in FIG. 10, if the focal length of the liquid crystal lens is smaller than the distance between the liquid crystal lens and the light homogenizing member 114, then after the divergence angle of the illumination light is reduced, the cross section of its light spot incident on the incident surface of the light homogenizing device 114 becomes smaller instead.

Specifically, the standard luminous flux $L_O$ of the illumination light emitted by the light emitting device 110 can also be regarded as the luminous flux of the illumination light normally emitted by the light emitting device 110, that is, the luminous flux when k=1. In other words, the projection light obtained by the DMD modulating the illumination light of the standard luminous flux $L_O$ according to the original grayscale value of the image data can exactly restore the grayscale of the image data. The light emitting device adjusting the luminous flux of the illumination light according to the adjustment coefficient k is to adjust the luminous flux of the illumination light to be 1/k of the original luminous flux. That is, the adjusted luminous flux emitted by the light emitting device 110 is 1/k of the standard luminous flux, i.e., $L_O/k$. Each of the mirror units of the DMD receives the illumination light having the luminous flux of $L_O/k$ and modulates the illumination light having the luminous flux of $L_O/k$ according to the adjusted grayscale value $kG_i$, to generate projection light. The luminous flux of the projection light is $kG_i \times L_O/k$, which is the same as the luminous flux $G_i \times L_O$ that is obtained by modulating the original luminous flux $L_O$ according to the original grayscale value $G_i$. The projection light emitted by each of the mirror units 102 of the DMD accurately restores the grayscale value of the respective pixel of the image data.

At Step S5, a projection image is generated according to the projection light. The brightness of the projection light matches the image data prior to increasing the grayscale values.

The step S5 can be implemented by a projection lens. The projection lens can receive the projection light emitted by the DMD and project the projection light on a projection screen to display the projection image. Since the reduction ratio of the luminous flux of the illumination light is adapted to the increase ratio of the grayscale value of the image data, the brightness of the projection light matches the image data prior to increasing the grayscale values.

The above embodiments are merely used to illustrate the technical solutions of the present disclosure and are not intended to be limiting, although the present disclosure has been described in detail with reference to the preferred embodiments. It should be understood by those skilled in the art that the modifications and equivalents of the present disclosure may be made without departing from the spirit and scope of the present disclosure.

What is claimed is:

1. A projection system, comprising:
a signal processor configured to receive image data comprising a plurality of grayscale values, each of which corresponds to one pixel, wherein the signal processor is further configured to increase grayscale values of a plurality of pixels of the image data;
an adjusting member configured to reduce luminous flux of illumination light provided to a DMD when the grayscale values of the image data are increased, so that the DMD modulates the illumination light with the reduced luminous flux according to the image data with the increased grayscale values, to generate projection light required for projecting the image data,
wherein the image data received by the signal processor comprises subframe image data,
the signal processor is configured to compare a highest grayscale value of respective pixels in the subframe image data with a preset value, when the highest grayscale value is smaller than the preset value, the signal processor increases the grayscale values of each of pixels of the subframe image data, wherein the adjustment member is configured to adjust the luminous flux of the illumination light provided to the DMD to be smaller than standard luminous flux when the grayscale values of the subframe image data are increased.

2. The projection system according to claim 1, wherein a grayscale maximum value that the projection system can reach is $G_{Max}$, the preset value is $G_R$, and the preset value $G_R$ is smaller than or equal to the grayscale maximum value $G_{Max}$.

3. The projection system according to claim 2, wherein the preset value is set to be 90% of the grayscale maximum value $G_{Max}$.

4. The projection system according to claim 1, wherein the signal processor is further configured to calculate an adjustment coefficient k when the highest grayscale value of the respective pixels in the subframe image data is smaller than the preset value, and to adjust a grayscale value of each of pixels of the subframe image data to be k times of the grayscale value of each of pixels of the subframe image data based on the adjustment coefficient k, wherein the adjustment coefficient k is equal to $G_{Max}/G_L$, $G_{Max}$ is a grayscale maximum value that the projection system can reach, $G_L$ is the highest grayscale value of the respective pixels in the subframe image data, wherein the adjustment member is configured to adjust the illumination light provided to the DMD to be 1/k of the standard luminous flux.

5. The projection system according to claim 1, wherein the adjusting member comprises an adjustable aperture, the adjustable aperture is configured to block a peripheral portion of a light beam of the illumination light incident to the adjustable aperture, such that the illumination light exiting from the adjustable aperture has a smaller divergence angle and an increased F number with respect to the illumination light incident to the adjustable aperture, and thus the luminous flux of the illumination light exiting from the adjustable aperture is reduced.

6. The projection system according to claim 1, further comprising a light source module configured to emit illumination light and a light homogenizing member configured to homogenize the illumination light,
the adjusting member is located between the light source module and the homogenizing member and comprises a liquid crystal lens; and
the liquid crystal lens is configured to reduce a divergence angle of the illumination light under driving of a driving member, so that a cross sectional area of the illumination light, when being incident to an incident surface of the light homogenizing member, is larger than an area of the incident surface, such that the illumination light has reduced luminous flux.

7. A projection method, comprising:
receiving image data comprising a plurality of grayscale values, each of which corresponds to one pixel;
increasing grayscale values of a plurality of pixels of the image data;
controlling to reduce luminous flux of illumination light provided to a DMD when the grayscale values of the image data area increased, so that the DMD modulates the illumination light with the reduced luminous flux based on the image data with the increased grayscale values, to generate projection light required for projecting the image data,
wherein the image data comprises subframe image data, and said increasing grayscale values of a plurality of pixels of the image data comprises:
comparing a highest grayscale value of the plurality of pixels in the subframe image data with a preset value, and increasing the grayscale values of the plurality of pixels of the subframe image data when the highest grayscale value is smaller than the preset value;
wherein said controlling to reduce luminous flux of illumination light provided to the DMD when the grayscale values of the image data area increased comprises:
controlling to adjust the luminous flux of the illumination light provided to the DMD to be smaller than standard luminous flux when the grayscale values of the subframe image data are increased; or wherein the image data comprises subframe image data, and the method further comprises:
comparing a highest grayscale value of the plurality of pixels in the subframe image data with a preset value, and when the highest grayscale value is larger than or equal to the preset value, keeping the grayscale values of the respective pixels of the subframe image data unchanged; and
controlling the luminous flux of the illumination light provided to the DMD to be standard luminous flux, so that the DMD modulates the illumination light with the standard luminous flux based on the subframe image data with the unchanged grayscale values, to generate the projection light required for projecting the subframe image data.

8. The projection method according to claim 7, wherein said increasing the grayscale values of the plurality of pixels of the subframe image data when the highest grayscale value is smaller than the preset value comprises:
calculating an adjustment coefficient k when the highest grayscale value is smaller than the preset value, wherein the adjustment coefficient k is equal to $G_{Max}/G_L$, $G_{Max}$ is a grayscale maximum value that the projection system can reach, and $G_L$ represents the highest grayscale value of the respective pixels in the subframe image data; and
adjusting a grayscale value of each of pixels of the image data to be k times the grayscale value of each of the plurality of pixels of the image data based on the adjustment coefficient k,
wherein said controlling to adjust the luminous flux of the illumination light provided to the DMD to be smaller than standard luminous flux when the grayscale values of the subframe image data are increased comprises:
controlling to adjust the luminous flux of the illumination light provided to the DMD to be 1/k of the standard luminous flux when the grayscale value of each of pixels of the subframe image data is increased to be k times the grayscale value of each of the plurality of pixels of the image data.

9. A projection system, comprising:
a signal processor configured to receive image data comprising a plurality of grayscale values, each of which corresponds to one pixel, wherein the signal processor is further configured to increase grayscale values of a plurality of pixels of the image data;
an adjusting member configured to reduce luminous flux of illumination light provided to a DMD when the grayscale values of the image data are increased, so that the DMD modulates the illumination light with the reduced luminous flux according to the image data with the increased grayscale values, to generate projection light required for projecting the image data,
wherein the image data received by the signal processor comprises subframe image data,
the signal processor is configured to compare a highest grayscale value of respective pixels in the subframe image data with a preset value, when the highest grayscale value is larger than or equal to the preset value, the signal processor keeps the grayscale values of the respective pixels of the subframe image data unchanged, wherein the adjustment member is configured to provide illumination light with standard luminous flux to the DMD, so that the DMD modulates the illumination light with the standard luminous flux based on the subframe image data with the unchanged grayscale values, to generate the projection light required for projecting the subframe image data.

10. The projection system according to claim 1, further comprising a light source module configured to emit illumination light, wherein the adjusting member adjusts the luminous flux of the illumination light provided to the DMD by adjusting luminous flux of the illumination light emitted by the light source module.

11. The projection system according to claim 1, further comprising a light emitting device comprising a light source module and an optical relay system, wherein the light source module is configured to emit illumination light, and the optical relay system is configured to receive the illumination light and relay the illumination light to the DMD, and the adjusting member adjusts the luminous flux of the illumination light provided to the DMD by changing a divergence angle of the illumination light exiting from the optical relay system.

12. The projection system according to claim 11, wherein the adjusting member adjusts the luminous flux of the illumination light provided to the DMD by changing the luminous flux of the illumination light emitted by the light source module while changing the divergence angle of the illumination light exiting from the optical relay system.

\* \* \* \* \*